June 13, 1950 — G. C. MUELLER — 2,511,291
MIXER FOR LIQUIDS
Filed March 12, 1947

INVENTOR
GROVER C. MUELLER
BY
ATTORNEY

Patented June 13, 1950

2,511,291

UNITED STATES PATENT OFFICE 2,511,291

MIXER FOR LIQUIDS

Grover C. Mueller, Los Angeles, Calif.

Application March 12, 1947, Serial No. 734,281

4 Claims. (Cl. 137—111)

This invention relates to a mixer for liquids and in particular for a mixer for hot and cold water for showers.

One object of the invention is to provide an improved simple device for mixing hot and cold water for showers and similar purposes. Another object is to provide a simple positive device for continuously mixing streams of miscible liquids having different properties to a mixture of uniform properties. A further object is to provide a liquid mixing device which is simple in construction and requires no attention after installation. These and other objects are attained by my invention which will be understood from the following description, reference being made to the accompanying drawings in which:

Figures 1, 2, 3, 4:
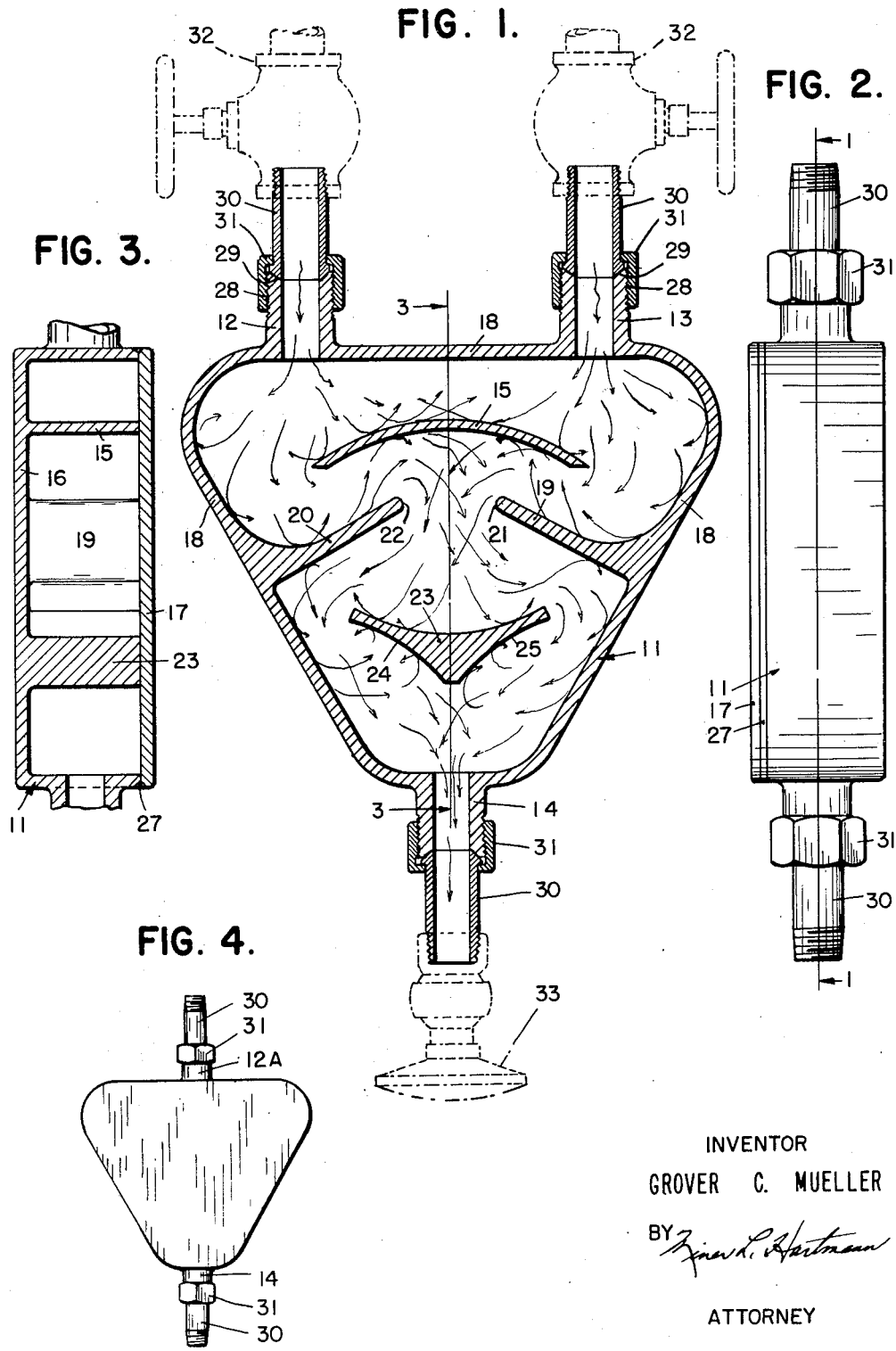
Fig. 1 is a cross-sectional view taken on the line 1—1 of Fig. 2.
Fig. 2 is an edge elevational view of my mixing device.
Fig. 3 is a cross-sectional view taken on the line 3—3 of Fig. 1.
Fig. 4 is a side elevational view showing a modified form of my invention.

Referring to the drawings, my mixing device in general consists of an enclosed chamber containing suitably placed baffles to produce the maximum amount of mixing and turbulence when one or more streams of water or other liquid of non-uniform properties is continuously introduced into the device and is continuously discharged from another part of the device.

The body 11 of the preferred form of my mixer is preferably triangular in longitudinal cross section and of thickness about one half the height, and is provided with inlet orifices 12 and 13 in one side of the triangular body and with an outlet orifice 14 disposed at the apex of the triangular form opposite the two inlet orifices. The orifices are conveniently outwardly extending necks. The corners of the otherwise triangular body are preferably rounded to avoid the formation of pockets in which non-circulating liquid might lodge. Opposite the two inlet necks 12 and 13, there is provided an inlet baffle plate 15 which extends from the back plate 16 to the front plate 17. The inlet baffle plate is curved, with its convex side directed toward the inlets; is positioned intermediate the inlet necks 12 and 13, and arranged so that the incoming liquid is diverted toward the outside walls 18. Sides baffles 19 and 20 are provided which extend from the side walls 18 to a position beneath the inlet baffle 15 and arranged to permit the flow of liquid through the throat formed between the ends 21 and 22 of said side baffles. An outlet baffle 23 is arranged intermediate the opening at the ends 21 and 22 of the side baffles 19 and 20 and the outlet 14. The outlet baffle is preferably concavely curved on the side facing the inlet necks and is also provided with concave under surfaces 24 and 25 facing the outlet neck 14, the intersection of the concave surfaces 24 and 25 being in the center line of the device directly opposite the outlet, with space between the ends of said outlet baffle to permit the flow of liquid around the ends of the baffle.

The inlet baffle 15 and the outlet baffle 23 are conveniently made integral with the backplate 16 and the side baffles 19 and 20 may be made integral with the backplate as well as with the outside walls 18 of the body. I prefer to form the body 11 including the baffles and the inlet and outlet necks by casting in one piece and then permanently close the body by means of a front plate 17 which is welded at 27 to the edge of the walls 18 to form a substantially integral mixing device. As shown in Figs. 1 to 3, the inlet and outlet necks 12, 13 and 14 are externally threaded at 28 and are provided with seats 29 adapted for connection to tail pieces 30 by means of a tailpiece nut or union 31, the tailpieces 30 of the inlets 12 and 13 being threaded at their opposite ends for connection to valve means 32 adapted to separately control the flow of two liquids into the device. The tail piece 30 attached to the outlet neck 14 is shown in Fig. 1 as attached to a shower head 33, this being illustrative of one use for my device.

In Fig. 4 is shown an alternative arrangement in which a single inlet 12A is arranged on one side of the triangular body 11 at its center position in place of the two inlet necks shown in Fig. 1. This arrangement of the inlet neck 12A permits the connection to a source of incompletely mixed hot and cold water or other non-uniform liquid which may require mixing, my device serving to insure that the mixture is continuously made uniform in temperature or composition by its passage through the mixer device. One, two, or more inlets may be used.

As indicated in the drawings and in the above description, my device is particularly adapted for insuring that the temperature of the water going to a shower head is uniform irrespective of the actual temperature itself, controlled by the separate valves on the pipes leading in the hot and cold water. The arrangement of my device and its capacity to hold a considerable quantity of water insures that there will be no sudden change in the temperature of the liquid discharged at the outlet neck. Any sudden change in the proportioning of the hot or cold water sources will be felt as gradual changes in the temperature at the outlet, which provides sufficient time warning for the hand adjustment of the proportions to give the desired outlet temperature.

It will be apparent that my mixer device may be used not only for giving a liquid a uniform temperature but for mixing liquids of different kinds to give a uniformly mixed composition at the outlet.

I claim:

1. A mixer for liquids comprising a hollow body having triangularly disposed edge walls, with front and back walls substantially parallel and perpendicular to said edge walls; inlet means disposed on one edge wall, said inlet means being adapted for connection through control valves to two or more sources of liquids having different properties; an outlet means disposed at the junction of said other two edge walls; an inlet baffle disposed within said hollow body opposite said inlet means extending from said front wall to said back wall facing said inlet means and arranged to divert the flow of incoming liquid around its ends toward said triangularly disposed edge walls; an outlet baffle disposed within said hollow body adjacent said outlet means extending from said front wall to said back wall, and edge baffles disposed within said hollow body and extending inwardly from opposite edge walls to form a throat intermediate said inlet and said outlet baffles, said edge baffles extending from said front to said back wall.

2. A mixer for liquids comprising a hollow body having triangularly disposed edge walls, with front and back walls substantially parallel and perpendicular to said edge walls; inlet orifices in one edge wall, said inlet orifices being adapted for connection through separate control valves to sources of liquids having different properties; an outlet orifice at the junction of the other two edge walls; an inlet baffle disposed within said hollow body opposite said inlet orifices extending from said front wall to said back wall facing said inlet orifices and arranged to divert the flow of incoming liquid around its ends toward said triangularly disposed edge walls; an outlet baffle disposed within said hollow body adjacent said outlet orifice extending from said front wall to said back wall, and edge baffles disposed within said hollow body and extending inwardly from opposite edge walls to form a throat intermediate said inlet and said outlet baffles, said edge baffles extending from said front to said back wall.

3. A mixer for liquids comprising a hollow body having triangularly disposed edge walls, with front and back walls substantially parallel and perpendicular to said edge walls; inlet orifices extending from one edge wall, said inlet orifices being adapted for connection through separate control valves to sources of liquids having different properties; an outlet orifice extending from the junction of the other two edge walls; a curved inlet baffle disposed within said hollow body opposite said inlet orifices extending from said front wall to said back wall with the convex surface of said baffle facing said inlet orifices and arranged to divert the flow of incoming liquid around its ends toward said triangularly disposed edge walls; a curved outlet baffle disposed within said hollow body adjacent said outlet orifice extending from said front wall to said back wall, with its concave surface facing toward said inlet baffle; and edge baffles disposed within said hollow body and extending inwardly from opposite edge walls to form a throat intermediate said inlet and said outlet baffles, said edge baffles extending from said front to said back wall.

4. A mixer for hot and cold water comprising a hollow body having triangularly disposed edge walls, with front and back walls substantially parallel and perpendicular to said edge walls; two inlet necks extending from one edge wall, said inlet necks being adapted for connection through separate control valves to sources of hot and cold water; an outlet neck extending from the junction of said other two edge walls, adapted to be connected to a shower head or the like; a curved inlet baffle disposed within said hollow body opposite said inlet necks extending from said front wall to said back wall with the convex surface of said baffle facing said inlet necks and arranged to divert the flow of incoming hot and cold water around its ends toward said triangularly disposed edge walls; a curved outlet baffle disposed within said hollow body adjacent said outlet neck, extending from said front wall to said back wall, with its concave surface facing toward said inlet baffle; and edge baffles disposed within said hollow body and extending inwardly from opposite edge walls to form a throat intermediate said inlet and said outlet baffles, said edge baffles extending from said front to said back wall.

GROVER C. MUELLER.

REFERENCES CITED

The following references are of record in the file of this patent:

UNITED STATES PATENTS

| Number | Name | Date |
| --- | --- | --- |
| 1,373,829 | Perdue | Apr. 5, 1921 |
| 1,398,941 | Gable | Nov. 29, 1921 |
| 1,714,694 | Riley | May 28, 1929 |

FOREIGN PATENTS

| Number | Country | Date |
| --- | --- | --- |
| 140,024 | Germany | Sept. 5, 1902 |